(No Model.) 3 Sheets—Sheet 1.

B. A. LILLIE.
FRUIT STONING MACHINE.

No. 383,739. Patented May 29, 1888.

Witnesses,
Geo. H. Strong.

Inventor,
B. A. Lillie.
By Dewey & Co.
Att'ys (No Model.)  3 Sheets—Sheet 2.

B. A. LILLIE.
FRUIT STONING MACHINE.

No. 383,739. Patented May 29, 1888.

Witnesses,
Geo. H. Strong.

Inventor,
B. A. Lillie.
By Dewey & Co.
attys (No Model.) 3 Sheets—Sheet 3.

B. A. LILLIE.
FRUIT STONING MACHINE.

No. 383,739. Patented May 29, 1888.

Witnesses,
Geo. H. Strong.
J. H. Krouse.

Inventor,
B. A. Lillie.
By
Dewey & Co.
Attys

UNITED STATES PATENT OFFICE.

BENJAMIN A. LILLIE, OF SAN FRANCISCO, CALIFORNIA.

FRUIT-STONING MACHINE.

SPECIFICATION forming part of Letters Patent No. 383,739, dated May 29, 1888.

Application filed September 24, 1887. Serial No. 250,633. (No model.)

*To all whom it may concern:*

Be it known that I, BENJAMIN A. LILLIE, of the city and county of San Francisco, and State of California, have invented an Improvement in Fruit-Stoning Machines; and I hereby declare the following to be a full, clear, and exact description thereof.

My invention relates to that class of machines for stoning fruit which is particularly exemplified by my patent, No. 174,371, dated March 7, 1876, and in which are employed rotating cutters mounted upon adjustable frames in such a way that when they seize the fruit between their cutting-edges and carry it down between them they may conform themselves to the size and shape of the pit against which they operate, and in which are also employed, in connection with said cutters, knives or scrapers located below for releasing the flesh of the fruit from the pit or stone.

My present invention consists in certain new and useful improvements in this class of machines, said improvements being briefly stated as consisting of novel adjustable opposing guides on each side of the rotating cutters, adjustable protectors and prongs on the cutters, and adjustable knives in connection with the ordinary knives or scrapers, all of which I shall hereinafter fully describe.

The objects of my invention will hereinafter more fully appear in connection with the description of the several improvements.

Figure 1:
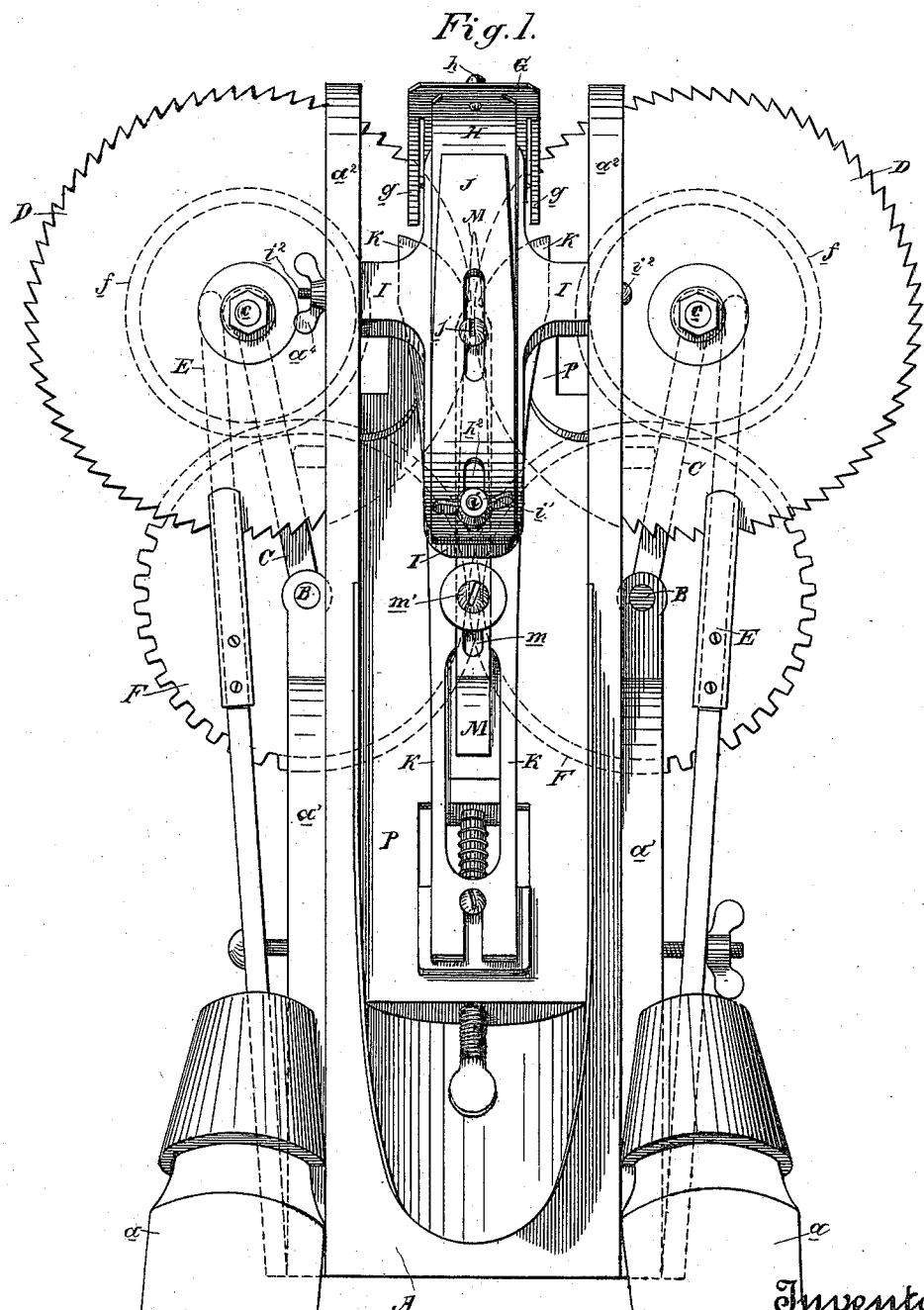
Figure 3:
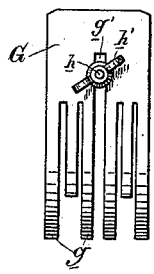
Figure 2:
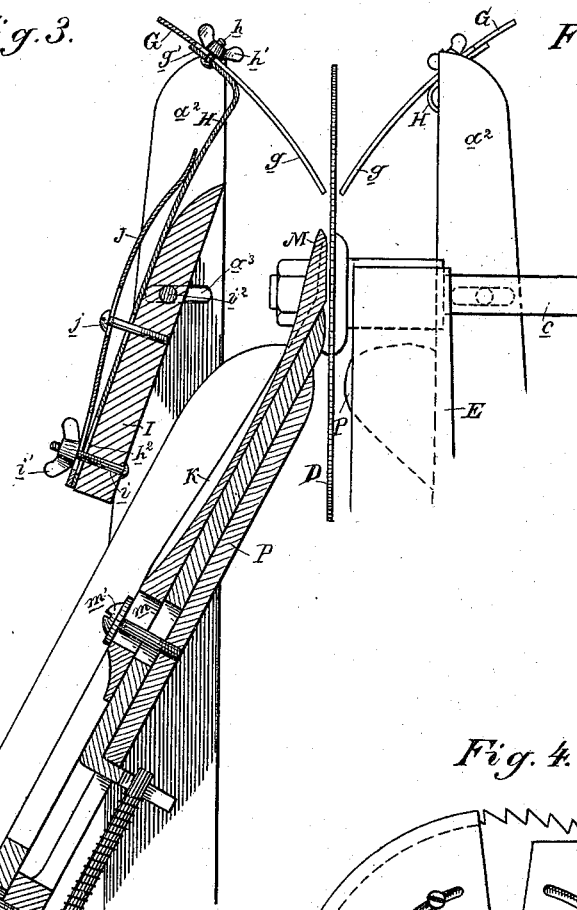
Figure 4:
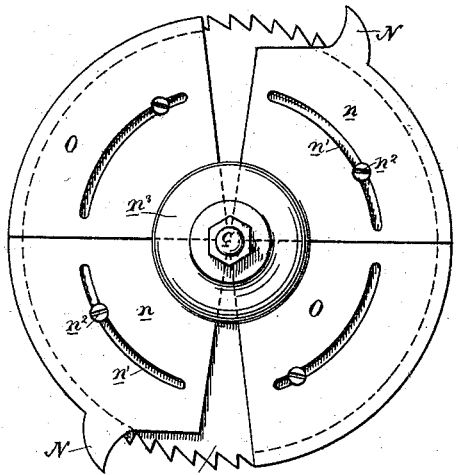
Figure 5:
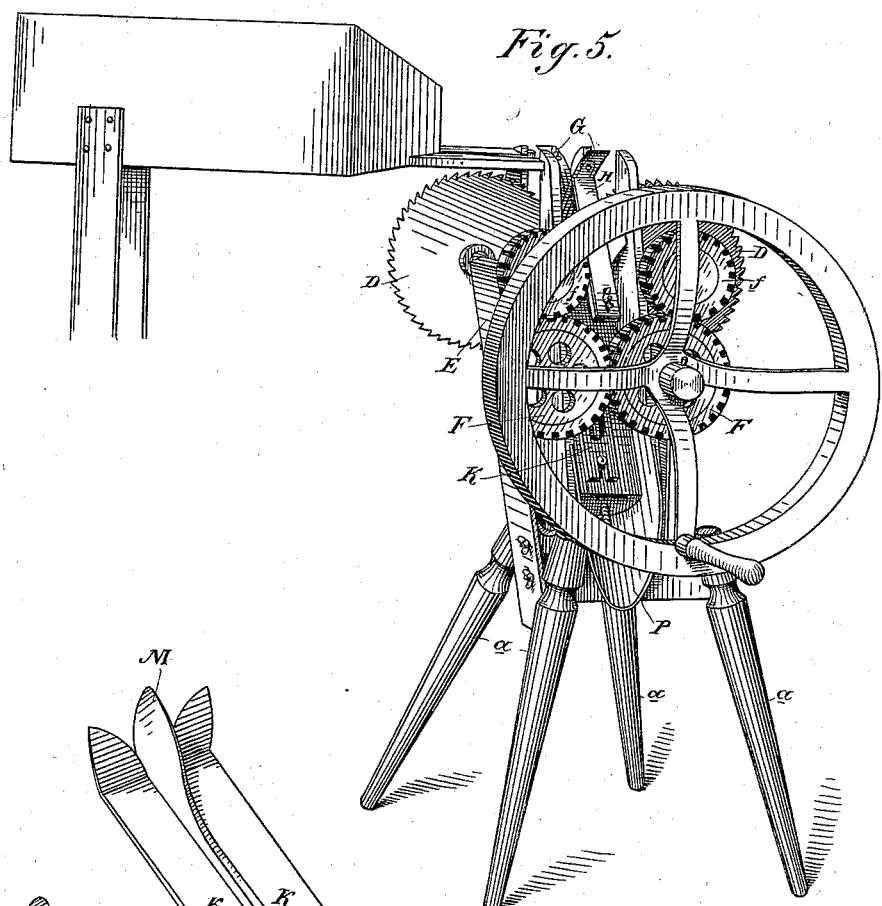
Figures 6, 7:
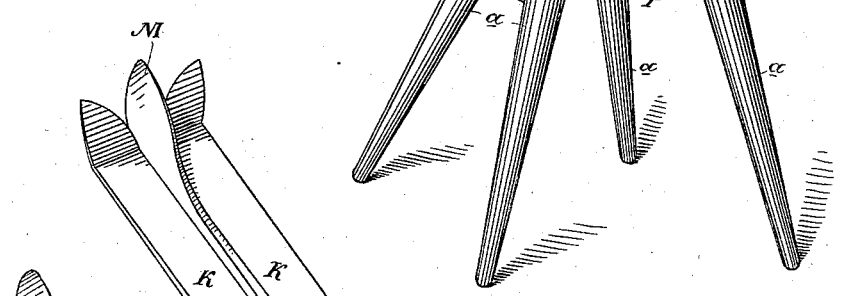

Referring to the accompanying drawings, Figure 1 is a side elevation of my machine. Fig. 2 is an end elevation and vertical section. Fig. 3 is a front elevation of one of the guide-plates G. Fig. 4 is a side elevation of one of the rotary cutters, showing the attachment of the adjustable prongs and protecting-plates. Fig. 5 is a perspective view of my machine. Fig. 6 is a perspective view of the scraping-knives K and the quartering-knife M. Fig. 7 is a perspective view of the quartering-knife.

A is the frame of the machine, consisting of legs $a$, the head-bracket $a'$, and standards $a^2$. In the head-bracket $a'$ are mounted on each side shafts B, on which are pivoted the brackets C, which carry the shafts $c$, on which the circular rotary cutters D are mounted. Springs E bear against the tops of the brackets C, so as to keep the cutters close to each other, and yet allow them to separate or expand to conform to the size and shape of the passing pit or stone.

Upon the shafts B are mounted the intermeshing gears F, each of which meshes with a pinion, $f$, on the shafts $c$ of the cutters, whereby rotation is imparted to said cutters, and at the same time the position of the gears is such as to maintain their engagement, while permitting the expansion or separation of the cutters. These cutters are of the form shown in my previous patent, having their peripheries made with saw-teeth, as shown, and they are located in line and rotate toward each other, though without touching.

The first improvement herein consists in the oppositely-located guides G. These are curved metal plates of a springy nature, and having their lower ends split to form flexible or spring fingers $g$, Fig. 3. Each plate is mounted on a spring-arm, H, by means of a slot, $g'$, fitting over a fixed pin, $h$, in the spring-arm, and fixed by a thumb-nut, $h'$, so that the said plates may be moved in the direction of their length. The spring-arms are mounted at their lower ends upon brackets I by means of slots $h^2$ in the arms fitting over fixed pins $i$ in the brackets, and set by means of thumb-nuts $i'$, whereby the arms may be adjusted lengthwise up or down.

The brackets I are mounted in the standards $a^2$ of the main frame by means of end pins, $i^2$, which project through elongated horizontal slots $a^3$, made in the standards, and are set in position by thumb-nuts $a^4$, so that said brackets may have an axial adjustment and also a horizontal adjustment. On the back of the spring-arms is secured a tension-spring, J, the power of which is regulated and controlled by means of a screw, $j$, passing through elongated slots therein and into the brackets I, said tension-springs being slotted similarly to the spring-arms, so that they do not interfere with the adjustment of said arms. In addition to the obvious function of these tension-springs, they also have the function, when tightened up, of adjusting the spring-arms forward.

The guide-plates are curved, as shown, and occupy a position on each side of and in a plane passing between the rotary cutters, though their fingers do not come in contact with the cutters. Their operation is as follows: When the peach or other fruit is fed down to the cutters, it first drops in between the guide-plates, and as the teeth of the cutters sink through the flesh of the fruit and engage its pit the drawing-down tendency due to this engagement causes the opposing plates to approach each other more closely, binding on the fruit and holding it perfectly true and steady. This effect is due to so mounting the plates that they move about a center below through a downward curve, so that they move toward each other, instead of tending to separate, and as the fruit is pulled between them they come closer together, with the effect of holding it more firmly. The spring-fingers of the plates are sufficiently yielding to prevent injury to the fruit, though they conform closely to its surface, thereby rendering their grip more perfect. It will be seen that these guide-plates have a variety of adjustments, which enables the operator to set them to the proper position for work on different kinds of fruit. For fruit which is of about the same size a single adjustment in the first instance is sufficient, for the spring of the arms which support the plates and the spring of the plates themselves are enough to allow them to conform to slight variations in the size; but if it be found that a vertical adjustment is necessary to bring the plates down farther it can be done by moving the plates themselves on the spring-arms, and when this limit of adjustment is reached a further adjustment, somewhat greater, may be made by moving the spring-arms down on their brackets and turning the brackets axially to bring the plates to the same position, though lower down, and the plates may then be brought closer together by moving the brackets horizontally, thus adjusting them, as far as their separation is concerned, to their previous position, so that by means of the several adjustments the operator is enabled to set the plates in any position with relation to each other or with relation to the cutters that he may find advisable for the particular fruit upon which the machine is then working.

Between the standards, and on each side, are fixed the downwardly-extending divergent chutes P for discharging the fruit when stoned, the stones themselves being discharged between said guide-chutes. Secured to the faces of these chutes are bifurcated scrapers or knives K, the upper ends of which come close up to the sides of the cutters near their rims, and their lower ends are united by spring-arms, so that said cutters or scrapers may expand to conform to the curvature and size of the passing pit, whereby they are enabled to scrape the flesh from it. These scrapers or knives, which are substantially the same as those similarly lettered in my previous patent, above referred to, have secured between the blades of each of them, with its point at right angles to their upper edges, a knife, M, which has a spring-shank, and is fitted by means of a slot, $m$, on the fixed pin or bolt $m'$, so that it may be adjusted up or down to conform to the position of the main knife or scraper. The fruit, which is cut in halves by the rotating cutters, is forced downward by the engagement of the teeth of said cutters with the pit into contact with the knives K M below. While the knives K scrape the pit and remove the flesh from it, the knives M serve to cut the flesh into quarters, and also serve to guide the pit downwardly with accuracy. When used as guides alone, they need not have cutting-edges. They can be readily removed when it is not desired to cut the fruit into quarters; but when it is desirable to do so, or to have guides for the pit, they can be readily inserted in the machine.

In some cases, and with some kinds of fruit—such, for example, as clingstone peaches, in operating on which a stronger adjustment of the several parts is made—it may be necessary to provide a supplementary means for pushing the fruit down, in addition to the power which is applied by the rotating cutters themselves, the teeth of which engage the pit.

In my previous patent I have referred to prongs which are secured to the cutters and project from their peripheries, the object of said prongs being to engage the fruit from above and assist the cutters in forcing it down between them. My present improvement is to render them adjustable in connection with adjustable plates, whereby said prongs may be set up to different exposed portions of the teeth of the cutters. Accordingly I form the prongs N, Fig. 4, on the outer edge of segmental plates $n$, which are fitted to the side of the cutter, and can be moved thereon and adjusted by suitable means—such, for example, as the slot $n'$ and the thumb nut or screw $n^2$; or, if desirable, a hub-cap, $n^3$, may be employed to hold the plates to the side of the circular cutters, and if made large enough the slot and the screw or thumb-nut may be dispensed with. In connection with these prongs I have the following construction for covering up all but a specified portion of the teeth of the cutters, so that said cutters will not engage the fruit except at a point a little distance in advance of the prongs, whereby the prongs have an opportunity to come in contact with the top of the fruit before the teeth of the cutters can attempt to violently force it down, thus avoiding any tendency of the teeth to saw into the pit. I therefore make the plate $n$ of the prongs come out to cover the teeth of the cutters, and I secure to the cutters adjustably, in the same manner as the plates $n$ are secured, the segmental plates O, the edges of which also cover the teeth of the cutters. The only portion of said teeth which is exposed lies between a prong and the adjacent edge of the segmental plate O, and after these teeth have been used and become dull the plates $n$ and the plates O may be moved around, so as to expose or uncover those portions of the teeth which are in better condition for the work. Now, in order to vary the length of the exposed portions of the teeth, it will be seen that as the two plates $n$ and the two plates O do not entirely cover the surface of the cutter a movement of one of said plates toward the other can be had within limits, so as to expose or to cover a greater or less distance of the teeth. Now, when the fruit is fed, as before described, it is not engaged by the cutter until the exposed portion of its teeth comes around, when said teeth, engaging the pit, tend to force it down, and because when operating on clingstone peaches the machine has to be adjusted with regard to greater pressure, the fruit is held momentarily until the prongs come around and force it down positively against the scraping-knives below, and the distance is so short before the prongs come into action that the cutters have no opportunity of sawing into the pit, as they would otherwise do if a long surface of teeth were exposed, which would slip by the momentarily-arrested pit.

Having thus described my invention, what I claim as new, and desire to secure by Letters Patent, is—

1. In a fruit-stoning machine, and in combination with rotary cutters, the opposing curved spring guide-plates on each side of the cutters and the spring-arms secured below, and on which said plates are mounted, whereby the fruit in being drawn between the plates by the cutters is closed upon by the plates, substantially as described.

2. In a fruit-stoning machine, and in combination with the rotary cutters, the opposing curved guide-plates, the spring-arms on which they are mounted, whereby they close upon the fruit as it is drawn between them by the cutters, and an adjustable connection between the plates and the supporting spring-arms, substantially as described.

3. In a fruit-stoning machine, and in combination with the rotary cutters, the opposing guide-plates, the spring-arms on which they are mounted, and the adjustable connection of said spring-arms with their supports, substantially as described.

4. In a fruit-stoning machine, and in combination with the rotary cutters, the opposing guide-plates, the spring-arms on which they are mounted, the adjustable connection between the plates and the arms, and the adjustable connection between the arms and their supports, substantially as described.

5. In a fruit-stoning machine, and in combination with the rotary cutters, the opposing guide-plates, the spring-arms on which they are mounted, and the oscillating brackets on which the arms are mounted, whereby the plates may be adjusted to or from each other, substantially as described.

6. In a fruit-stoning machine, and in combination with the rotary cutters, the opposing guide-plates, the spring-arms on which they are mounted, and the adjustable tension-springs on the back of the spring-arms, substantially as described.

7. In a fruit-stoning machine, and in combination with the rotary cutters, the adjustable opposing guide-plates, the adjustable spring-arms on which they are mounted, and the adjustable brackets supporting the spring-arms, substantially as described.

8. In a fruit-stoning machine, and in combination with the rotary cutters, the bifurcated scraper-knives below, and the intervening quartering knives or guides secured thereto, substantially as described.

9. In a fruit-stoning machine, the rotary cutters, in combination with the bifurcated scraping-knives below, the intervening quartering knives or guides, and the adjustable connection between said knives or guides and the scraping-knives, substantially as described.

10. In a fruit-stoning machine, the rotary cutters, in combination with the adjustable segmental plates $n$, secured thereto and covering a portion of the teeth of the cutters, said plates having prongs projecting from the peripheries of the cutters, and the adjustable covering-plates O, secured to the cutters, whereby but a portion of the teeth of the cutters may be exposed in advance of the prongs, substantially as described.

11. In a fruit-stoning machine, the rotary cutters, in combination with the adjustable segmental plates $n$ and O on the side of the cutters and covering all their teeth but a portion which is left exposed, said plates being movable to and from each other to vary the length of the exposed portion, and the prongs N on the plates $n$, extending beyond the peripheries of the cutters, substantially as described.

In witness whereof I have hereunto set my hand.

BENJAMIN A. LILLIE.

Witnesses:
 S. H. NOURSE,
 H. C. LEE.